United States Patent [19]

Szydlowski et al.

[11] Patent Number: 4,861,347
[45] Date of Patent: Aug. 29, 1989

[54] COMPACT CHEMICAL REACTION VESSEL

[75] Inventors: Donald F. Szydlowski, Ellington; George T. Suljak, Vernon, both of Conn.

[73] Assignee: International Fuel Cells Corporation, South Windsor, Conn.

[21] Appl. No.: 947,068

[22] Filed: Dec. 29, 1986

[51] Int. Cl.⁴ .................................................. B01J 8/06
[52] U.S. Cl. .......................................... 48/61; 48/94; 422/200; 422/204; 429/19
[58] Field of Search .............. 422/198, 202, 200, 201, 422/203, 204, 211, 212; 48/61, 94; 429/19

[56] References Cited

U.S. PATENT DOCUMENTS

| | | | |
|---|---|---|---|
| 1,396,358 | 11/1921 | Cochrane | 422/202 |
| 2,078,948 | 5/1937 | Houdry | 422/200 |
| 2,115,714 | 5/1938 | Houdry et al. | 422/211 |
| 2,433,620 | 12/1947 | Kropp | 422/200 |
| 3,144,312 | 8/1964 | Mertens | 422/198 |
| 3,278,268 | 10/1966 | Pfefferle | 422/198 |
| 3,441,446 | 4/1969 | Heredy | 136/100 |
| 3,499,797 | 3/1970 | Hooper | 136/86 |
| 3,541,729 | 11/1970 | Dantowitz | 48/94 |
| 3,909,299 | 9/1975 | Corrigan | 422/198 |
| 4,378,336 | 3/1983 | Yoon | 422/201 |
| 4,554,223 | 11/1985 | Yokoyama | 429/20 |

FOREIGN PATENT DOCUMENTS 1327210  4/1963  France ............................ 422/198

Primary Examiner—Peter Kratz

[57] ABSTRACT

The vessel is a fuel/steam reformer which has an annular chamber containing a catalyst bed. The annular chamber is surrounded by a heating zone and heat pipes from the heating zone extend through the interior of the catalyst bed whereby the catalyst is concurrently heated from inside and outside of the bed. A burner is positioned coaxially of the annular chamber to supply the required heat. Raw fuel is fed into a vaporizing chamber below the catalyst bed and after vaporization, rises through the catalyst bed for conversion to a hydrogen rich fuel gas. The fuel gas is collected in a chamber above the catalyst bed. The device is particularly useful for compact methanol fuel cell power plants.

5 Claims, 3 Drawing Sheets 4,861,347

COMPACT CHEMICAL REACTION VESSEL

TECHNICAL FIELD

This invention relates to a compact chemical reaction vessel, and more particularly to a reformer for use in producing hydrogen-rich fuel for a compact fuel cell power plant.

BACKGROUND ART

Compact fuel cell power plants capable of producing up to 10 kW of power can have many areas of appllication in today's world. Such power plants can be made portable so as to be able to supply electrical power for vehicles, such as vans, trailers, boats or the like. Such compact power plants could also be used as emergency generators at such times when conventional electrical power sources are inoperative. Further fields of use for such compact fuel cell power plants include military and remote site installations.

It will be appreciated that small fuel cell power plants of the aforesaid nature will best use a raw fuel which is not exotic, can be easily stored and transported and is relatively inexpensive. One such fuel which can be converted to a hydrogen-enriched fuel gas for use in fuel cells is methanol. Raw methanol can be catalytically converted, with application of heat, to a hydrogen-enriched fuel gas for a fuel cell of the character described.

DISCLOSURE OF INVENTION

This invention relates to a compact reformer which can be used as a component of a portable fuel cell power plant to reform methanol or other like liquid raw fuel into a hydrogen-enriched gaseous fuel for consumption by the fuel cell. The reformer of this invention is cylindrical in shape and geometry, including an insulated housing, and can be made as small as about 1 foot in height and about 7 inches in diameter. The housing will be well insulated for heat retention and includes an axial burner opening through one end wall of the housing. An annular catalyst bed surrounds the burner. The catalyst bed is contained in an annular retainer. An annular refractory shield is interposed between the burner and the catalyst retainer and the outside surface of the refractory shield along with the inside surface of the reformer housing combine to form a heating zone in which the catalyst retainer is positioned. A plurality of heat tubes extend axially of the reformer housing through the catalyst bed at circumferentially spaced locations. The catalyst is heated quickly and evenly by the heating zone and by the heat tubes which open into the heating zone. Raw fuel is fed through tubes into a chamber heated by the heating zone and positioned below the catalyst bed. The raw fuel vaporizes with the chamber and rises through the catalyst bed to be converted into a hydrogen-rich gaseous fuel. The converted or reformed fuel is collected above the catalyst bed and withdrawn from the reformer.

It is therefore an object of this invention to provide a compact fuel reformer for use in a fuel cell power plant of relatively small size.

It is a further object of this invention to provide a reformer of the character described wherein the catalyst and fuel are quickly and evenly heated up to operating temperature.

It is another object of this invention to provide a reformer of the character described wherein the reformed fuel is efficiently produced and collected for use by the power plant.

These and other objects and advantages of the invention will become more readily apparent from the following detailed description of a preferred embodiment thereof when taken in conjunction with the accompanying drawings.

BEST MODE FOR CARRYING OUT THE INVENTION

Figure 1:
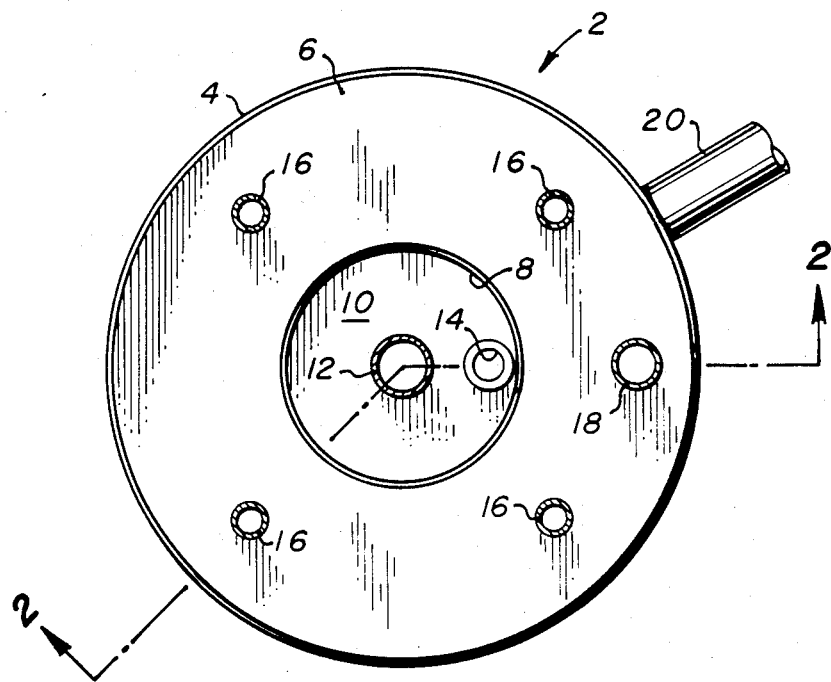
FIG. 1 is a top plan view of a reformer reaction vessel of compact size formed in accordance with this invention.

Referring now to the drawings, there is shown in FIG. 1 a preferred embodiment of a reformer vessel, denoted generally by the numeral 2, formed in accordance with this invention. The vessel 2 has a cylindrical housing 4 with a top end wall 6 having a central well 8 closed by a wall 10. A burner tube 12 is disposed coaxially of the housing 4 and extends through the wall 10. A spark plug fitting 14 is mounted in the wall 10 adjacent to the burner tube 12. Raw fuel inlet pipes 16 extend through the wall 6, as does a processed fuel outlet pipe 18. A burner exhaust pipe 20 extends through the housing 4.

Figure 2:
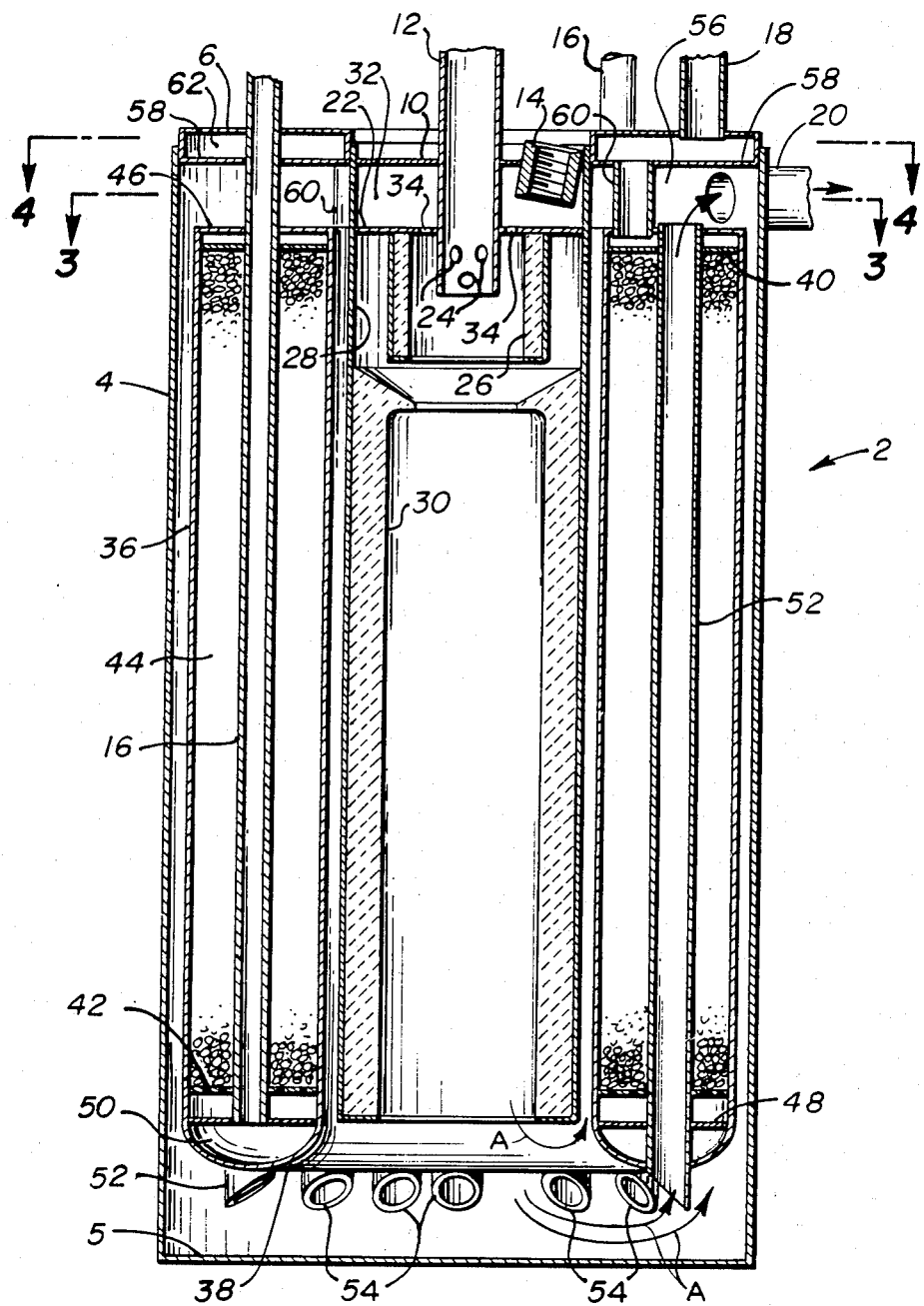
FIG. 2 is a sectional view of the device taken along lines 2—2 of FIG. 1.

Referring now to FIG. 2, the internal construction of the vessel 2 is shown. The burner tube 12 extends through the wall 10 and also through a subsequent wall 22. The tube 12 has flame ports 24 which open into an annular refractory ring 26 mounted on the wall 22. Outwardly spaced from the ring 26 is a sleeve 28 which extends beyond the wall 22 to the wall 10, and which contains another elongated refractory ring 30. The spark plug holder 14 extends into a ring-shaped flash or ignition chamber 32 bounded by the walls 10 and 22, and by the burner tube 12 and sleeve 28. There are openings 34 in the wall 22 for flash back of the gaseous burner fuel whereby a spark from a spark plug in the chamber 32 will ignite fuel issuing from the flame ports 24. The burner flame will thus project into the refractory rings 26 and 30. It will be noted that the sleeve 28 and the refractory ring 30 terminate short of the lower end wall 5 of the housing 4 whereby hot gases will flow outwardly past the end of the ring toward the sides of the housing 4 as per arrows A. Surrounding the sleeve 28 is an annular catalyst retainer 36 having a closed bottom 38. Inside of the retainer 36 there are upper and lower bed rings 40 and 42 respectively which define the upper and lower bounds of a catalyst bed 44 contained within the retainer 36. The bed rings 40 and 42 are both perforated to allow passage of fuel gas therethrough. The top of the retainer 36 is closed by an imperforate top ring 46. Spaced from the bottom 38 of the retainer 36 is a spacer ring 48 which is also perforated to allow passage of gas therethrough. Below the ring 48 in the bottom of the retainer 36 there are disposed a plurality of small refractory pellets 50 which are heated by the burner flame as will be set forth in greater detail hereinafter.

Figure 3:
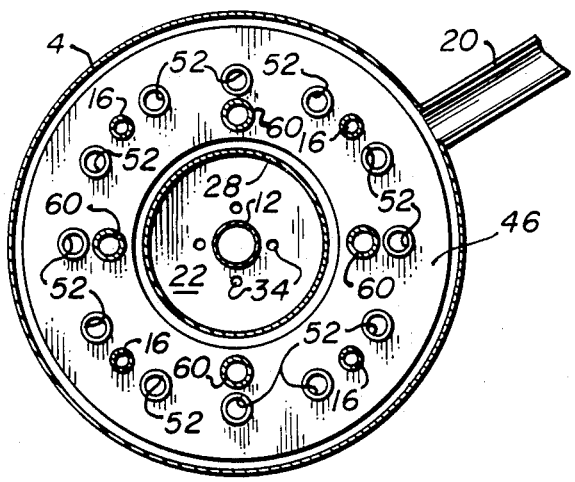
FIG. 3 is a sectional view taken along lines 3—3 of FIG. 2.
Figure 4:
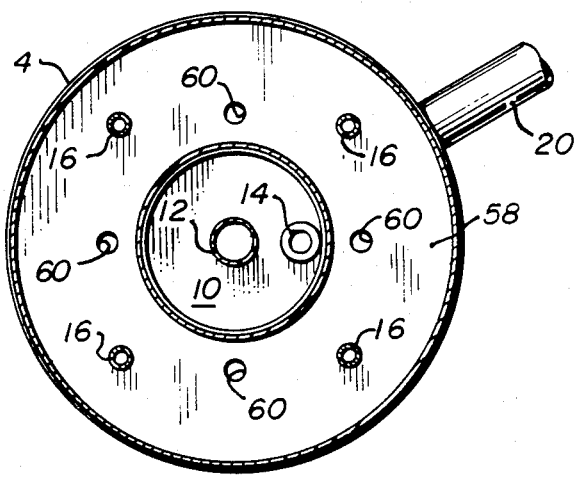
FIG. 4 is a sectional view taken along lines 4—4 of FIG. 2.

The raw fuel feeding tubes 16 extend through the top wall 6, the rings 46 and 40, the catalyst bed 44, and the rings 42 and 48. The tubes 16 are thus operable to feed raw fuel onto the heated pellets 50 from an external source of the raw fuel. A plurality of circumferentially spaced heat tubes 52 extend through the catalyst bed 44. The tubes 52 have lower open ends which project through the bottom wall 38 of the retainer 36, and have inwardly tapered end surfaces 54 which open toward the central axis of the vessel 2. The tubes 52 pass through the rings 48, 42 and 40 and open through the ring 46 into an annular burner exhaust manifold 56. The burner exhaust manifold is formed by the housing 4 on the outside, by the sleeve 28 on the inside, by the ring 46 on the bottom, and by a ring 58 on the top. A plurality of circumferentially spaced bypass pipes 60 open through the ring 46 from the top of the catalyst bed 44 and the ring 58 into a collection manifold 62 which empties into the processed fuel outlet pipe 18. FIGS. 3 and 4 show the relative positions in plan of the various pipes and tubes in the device.

The device operates as follows. In anticipation of the need for processed fuel for the fuel cell, a gas such as methane or the like is fed to the burner tube 12 and ignited by the spark plug igniter. The burner flame projects through the refractory sleeve 30 toward the closed end 5 of the housing 4. The heat generated by the flame spreads radially at the closed end of the housing 4 and progresses back toward the inlet end of the housing 4 outside of the sleeve 28. The area inside of the heat tubes 52 is heated, thus heating the catalyst bed 44 from the inside. The areas between the sleeve 28 and the retainer 36, as well as between the housing 4 and the retainer 36 are also heated to heat the catalyst bed 44 from the outside. The desired operating temperature of about 500° F. will be reached in about 15 minutes after ignition of the burner 12. Once operating temperatures are reached, raw fuel, such as methanol, is dripped through the tubes 16 onto the pellets 50 where it vaporizes. The methanol vapor rises back through the catalyst bed 44, where it is transformed into a hydrogen-rich fuel cell fuel, and thence through the ring 40 and into the pipes 60. The processed fuel is then exhausted from the manifold 62 through the exhaust pipes 18.

It will be readily appreciated that the reformer device of this invention is quite compact, and can be rendered operable very quickly to supply fuel cell anode fuel on demand. The catalyst bed will heat quickly and evenly.

Since many changes and variations of the disclosed embodiment of the invention may be made without departing from the inventive concept, it is not intended to limit the invention otherwise than as required by the appended claims.

We claim:

1. A vessel for catalytically reforming raw hydrocarbon fuels, said vessel comprising:
   (a) a housing having a cylindrical side wall;
   (b) burner means in said housing on the axis thereof for heating the interior of the housing, said burner means including a tubular refractory heat shield into which heat is propagated by said burner means;
   (c) means forming an annular catalyst bed in said housing, said catalyst bed being radially outwardly spaced from and surrounding said tubular heat shield, and radially inwardly spaced from and surrounded by said cylindrical side wall of said housing;
   (d) a plurality of circumferentially spaced heat tubes extending through said catalyst bed for ducting hot gases from said burner means through interior portions of said catalyst bed to heat the latter from the inside;
   (e) means for admitting raw liquid hydrocarbon fuel to a heated area in said vessel adjacent to said catalyst bed for vaporization of the raw fuel and subsequent percolation of the vaporized fuel through said catalyst bed to reform the raw fuel to a hydrogen-rich fuel gas;
   (f) means for collecting reformed fuel gas from said catalyst bed for subsequent use; and
   (g) heat exhaust means for exhausting hot burner gases through said heat tubes, through a first heating zone between said catalyst bed and said tubular heat shield, and through a second heating zone between said catalyst bed and said housing cylindrical side wall to a location outside said vessel.

2. The vessel of claim 1 further comprising a first imperforate ring overlying said catalyst bed to block gas flow from said catalyst bed, and wherein said heat tubes open through said first imperforate ring to allow passage of hot gases from said heat tubes to said heat exhaust means.

3. The vessel of claim 2 further comprising bypass pipe means opening through said first imperforate ring to duct reformed fuel gas from said catalyst bed, past said heat exhaust means, to said means for collecting reformed fuel gas.

4. The vessel of claim 3 wherein said means for collecting reformed fuel gas is a manifold defined in part by one imperforate end wall of said housing and by another imperforate ring adjacent to and spaced apart from said first imperforate ring.

5. The vessel of claim 1 wherein said means for admitting raw hydrocarbon fuel comprises at least one duct extending through a wall of said housing and through said catalyst bed to a vaporization chamber disposed adjacent to said catalyst bed.

* * * * *